US012557826B2

(12) United States Patent
Buczkowski et al.

(10) Patent No.: US 12,557,826 B2
(45) Date of Patent: Feb. 24, 2026

(54) PLANT-BASED MILK

(71) Applicant: SOCIETE DES PRODUITS NESTLE S.A., Vevey (CH)

(72) Inventors: Johann Buczkowski, Corcelles-le-Jorat (CH); Jannika Dombrowski, Lausanne (CH); Benoit Idieder, Villars sur Glane (CH); Luis Calisto, Quito (EC); Lionel Jean Rene Bovetto, Lucens (CH); Christophe Joseph Etienne Schmitt, Servion (CH)

(73) Assignee: Societe des Produits Nestle S.A., Vevey (CH)

( * ) Notice: Subject to any disclaimer, the term of this patent is extended or adjusted under 35 U.S.C. 154(b) by 558 days.

(21) Appl. No.: 17/755,809

(22) PCT Filed: Nov. 11, 2020

(86) PCT No.: PCT/EP2020/081796
§ 371 (c)(1),
(2) Date: May 9, 2022

(87) PCT Pub. No.: WO2021/094395
PCT Pub. Date: May 20, 2021

(65) Prior Publication Data
US 2022/0386641 A1     Dec. 8, 2022

(30) Foreign Application Priority Data
Nov. 11, 2019     (EP) .................................... 19208695

(51) Int. Cl.
*A23C 11/06*     (2006.01)
*A23C 11/10*     (2021.01)

(52) U.S. Cl.
CPC ............ *A23C 11/06* (2013.01); *A23C 11/103* (2013.01)

(58) Field of Classification Search
CPC ........... A23V 2250/1578; A23L 33/185; A23L 11/60; A23L 11/65; A23L 2/38;
(Continued)

(56) References Cited

U.S. PATENT DOCUMENTS

2014/0044855 A1     2/2014   Sher et al.
2019/0116852 A1*    4/2019   Kinkelaar ............. A23L 33/185

FOREIGN PATENT DOCUMENTS

CN          102238875 A      11/2011
CN          102415446 A       4/2012
(Continued)

OTHER PUBLICATIONS

Yokoyama et al., JP-2006061064-A, machine translation (Year: 2006).*
(Continued)

*Primary Examiner* — Hong T Yoo
(74) *Attorney, Agent, or Firm* — K&L Gates LLP

(57)     ABSTRACT

The invention concerns a liquid plant-based milk having an ingredient composition comprising the following ingredients: —at least one plant protein as the only source of protein of said composition, —at least one plant-based oil or fat, —at least one natural sweetener, —calcium citrate tetrahydrate as the only salt of calcium in said composition, —at least one buffer selected from the list of dipotassium phosphate, disodium phosphate, potassium lactate, sodium lactate, potassium carbonate, sodium carbonate, potassium citrate, sodium citrate and a mix of them and their corresponding acids, —optionally flavours, colorants and/or vitamins—water, said milk being free of gums, hydrocolloid thickeners and synthetic emulsifiers.

14 Claims, 2 Drawing Sheets

(58) Field of Classification Search

CPC . A23L 33/16; A23L 2/52; A23C 11/06; A23C 20/025; A23C 2240/15; A23C 9/13; A23C 19/093; A23C 11/103; A23C 9/1522; A23C 11/00; A23J 3/14; A23J 3/16; A23J 3/346; A23J 1/006; A23J 1/14

USPC .......................... 426/74, 656, 634, 590, 632

See application file for complete search history.

(56)                     References Cited

FOREIGN PATENT DOCUMENTS

| CN | 108463112 A | | 8/2018 |
|---|---|---|---|
| JP | S61216653 A | | 9/1986 |
| JP | 2005065542 A | * | 3/2005 |
| JP | 2006061064 A | * | 3/2006 |
| JP | 3889358 B2 | | 3/2007 |
| JP | 2015524276 A | | 8/2015 |
| WO | 2001054511 A1 | | 8/2001 |
| WO | 2003090551 A2 | | 11/2003 |
| WO | 2007107999 A1 | | 9/2007 |
| WO | 2011089751 A1 | | 7/2011 |
| WO | 2013078510 | | 6/2013 |
| WO | 2018146037 A1 | | 8/2018 |
| WO | 2019068590 A1 | | 4/2019 |
| WO | 2019115280 A1 | | 6/2019 |
| WO | 2019122336 | | 6/2019 |

OTHER PUBLICATIONS

Araki Hideo et al., JP-2005065542-A, machine translation (Year: 2005).*

Pathomrungsiyounggul et al., "Calcium-fortified Soymilk", Handbook of Food Fortification and Health: From Concepts to Public Health Applications, vol. 1, 2013, pp. 185-197.

Pathomrungsiyounggul et al., "Effect of Calcium Carbonate, Calcium Citrate, Tricalcium Phosphate, Calcium Gluconate and Calcium Lactate on Some Physicochemical Properties of Soymilk", International Journal of Food Science and Technology, vol. 45, 2010, pp. 2234-2240.

Gerstner, "Feasibility of Calcium Fortification in Dairy and Soy Drinks", Wellness Foods Europe, vol. 25, Oct./Nov. 2004, pp. 24-29.

"Soymilk, original and vanilla, unfortified", Wikipedia, Retrieved from <URL: https://fdc.nal.usda.gov/fdc-app.html#/food-details/172446/nutrients, Jan. 4, 2019, pp. 1-10.

European Notice of Opposition for Appl No. 20801321.9-1105 dated Oct. 2, 2024, 30 pages.

Japanese Office Office for Appl No. 2022-526762 dated Oct. 9, 2024, 6 pages.

Anonymous "MINTEL—Fresh Soyadrink with Calcium" Jun. 17, 2013, retrieved from www.gnpd.com, Database accession No. 2093180, XP055690852, 4 pages.

Anonymous "MINTEL—Barista Organic Oat Drink" Apr. 1, 2019, retrieved from www.gnpd.com, Database accession No. 6446785, XP055691300, 3 pages.

Anonymous "MINTEL—Oat Drink for Coffee" Oct. 17, 2019, retrieved from www.gnpd.com, Database accession No. 6961539, XP055691347, 5 pages.

Anonymous "MINTEL—Barista Edition Oat Milk" Oct. 2, 2019, retrieved from www.gnpd.com, Database accession No. 6907537, XP055691352, 4 pages.

Koder et al. "Calcium Citrate. The preferred calcium salt for the prevention of age-associated bone loss" International Food Information Service Abstract, 2001, XP002798907.

Weingartner et al. "Effects of Calcium Addition on Stability and Sensory Properties of Soy Beverage" Journal of Food Science, 1983, vol. 48, pp. 256-257.

Chinese Office Action for Appl No. 202080078191.7 dated Jul. 26, 2023.

Vavrusova et al., "Aqueous Solubility of Calcium Citrate and Interconversion between the Tetrahydrate and the Hexahydrate as a Balance between Endothermic Dissolution and Exothermic Complex Formation", International Dairy Journal, vol. 57, 2016, pp. 20-28.

Nti et al., "Development and Quality Characteristics of Shelf-Stable Soy-Agushie: a Residual by-Product of Soymilk Production", Food Science and Nutrition, vol. 4, Issue No. 2, 2016, pp. 315-321.

Giri et al., "Processing Influences on Composition and Quality Attributes of Soymilk and its Powder", Food Engineering Reviews, vol. 4, 2012, pp. 149-164.

European Office Action for Appl No. EP20801321.9 dated Feb. 11, 2025, 13 pages.

Japanese Office Action for Appl No. 2022-526762 dated Apr. 22, 2025, 3 pages.

* cited by examiner

PLANT-BASED MILK

CROSS REFERENCE TO RELATED APPLICATIONS

The present application is a National Stage of International Application No. PCT/EP2020/081796, filed on Nov. 11, 2020. which claims priority to European Patent Application No. 19208395.4, filed on Nov. 11, 2019, the entire contents of which are being incorporated herein by reference.

FIELD OF THE INVENTION

The present invention relates to a plant-based milk and its use in its use in coffee beverages.

BACKGROUND OF THE INVENTION

In the field of preparation of coffee beverages, milk is an indispensable additive for the preparation of beverages like café crème, cappuccino, latte macchiato or cups customized with latte art.

These milk and coffee beverages can be prepared by professional barista or with automatic machines. During the preparation of these beverages, milk can be cooled, heated, foamed mechanically or foamed by injection of hot water or steam, and finally can be mixed or added to either hot or cold coffee.

Traditionally, the milk used in this so-called "barista" style preparation of beverages is dairy milk. Today, with the trending demand for food products adapted for vegans and vegetarians, there is a need for alternative milks produced from plants and some plant-based milks have been developed specifically to be used in the barista style preparation of coffee beverages. For example, milk based on pea protein, almond, rice or oat are being commercialized.

It has been observed that most of these plant-based milks do not present the same properties as dairy milk when they are heated, foamed and mixed with coffee. The foam can be of very poor quality (foamed milk cannot be dispensed from a pitcher and latte art is not possible, foaming produces two clearly different phases: liquid and foam above rather than a mixture of both, foam is not stable, foam is too liquid, . . . ) and the mixture with coffee produces flocculation.

In addition, it has been noticed that out of these plant-based milks the ones presenting the better results in the preparation of coffee-based beverages are those comprising additives like gums to provide texture, mouthfeel, stability. Yet, since more and more consumers are concerned by the presence of these ingredients, the use of these additives is not desirable.

An object of the invention is to address at least some of the drawbacks of the plant-based milks of the prior art when they are used in the barista style preparation of coffee beverages. An object of the invention is to provide a plant-based milk presenting the following properties:

it can be added to hot or cold coffee beverages without flocculation, and it can be processed in coffee machine (cooling, heating, dispensing, foaming) or by professional baristas like common dairy milk, and once foamed, it presents the same properties as common dairy milk, for latter art for example, and it provides pleasant mouthfeel and taste.

It would be advantageous to provide a plant-based milk free of gums, hydrocolloid thickeners, synthetic emulsifiers.

DESCRIPTION OF THE INVENTION

Figure 1:
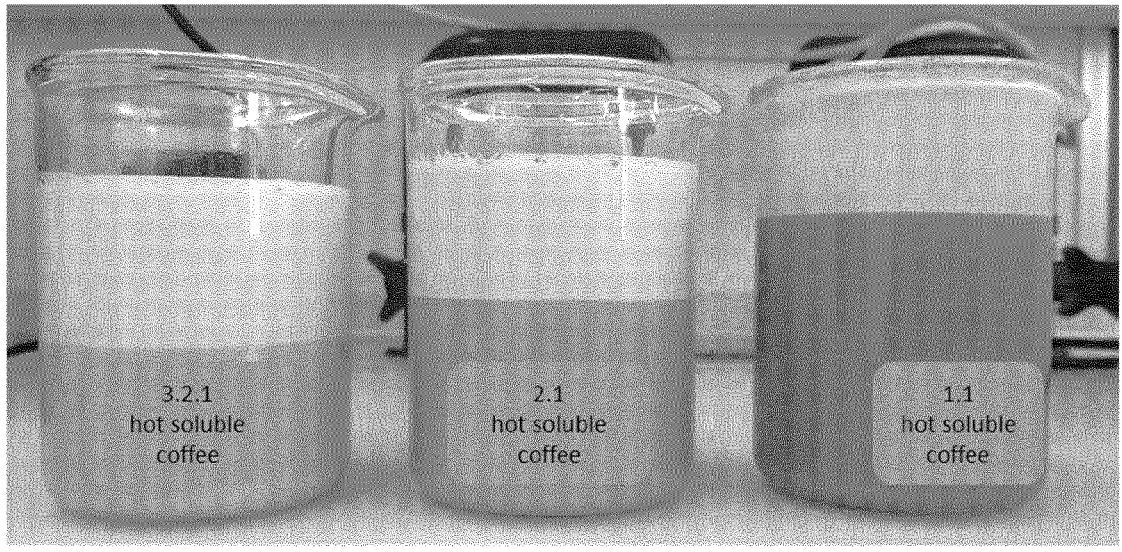
FIG. 1 shows the photos of the six beverages prepared in Example 2.2.
Figure 1:
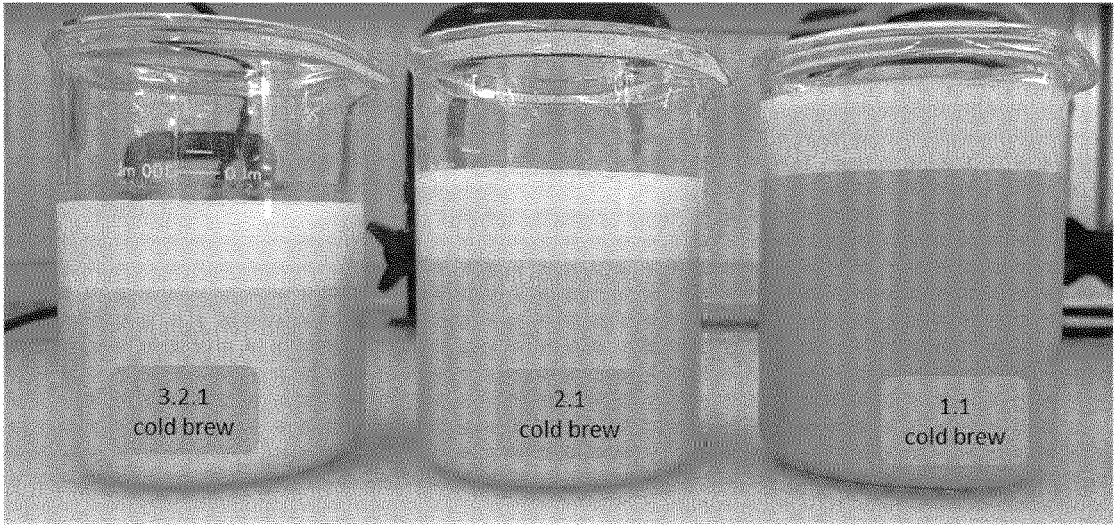

In a first aspect of the invention, there is provided a liquid plant-based milk having an ingredient composition comprising the following ingredients:

at least one plant protein as the only source of protein of said composition, at least one plant-based oil or fat, at least one natural sweetener, calcium citrate tetrahydrate as the only salt of calcium in said composition, at least one buffer selected from the list of dipotassium phosphate, disodium phosphate, potassium lactate, sodium lactate, potassium carbonate, sodium carbonate, potassium citrate, sodium citrate and a mix of them, and their corresponding acids, optionally flavours, colorants, vitamins water, said milk being free of gums, hydrocolloid thickeners and synthetic emulsifiers. It has been observed that the use of calcium citrate tetrahydrate as the only salt of calcium in such a based-plant milk is a key feature to improve the stability of the milk when used with coffee beverages.

Preferably, the natures and the quantities of the ingredients are selected so that the mineral composition of said milk comprises:

between 10 and 100 mmol/l of Ca, between 10 and 80 mmol/l of Na, between 20 and 200 mmol/l of K, between 15 and 150 mmol/l of P, for a concentration of citrate comprised between 7 and 70 mmol/l.

Depending on the origin of the ingredients and the minerals composition of these ingredients, the quantities of the ingredients can be selected to reach that concentrations of each mineral and that concentration of citrate in the final milk.

In general, these minerals come from plant protein, from buffers and/or from water depending on the ingredient supplier or on the factory.

It has been observed that this mineral composition with this concentration of citrate guarantees optimal stability of the plant-based milk when used with coffee beverages. In particular no flocculation is observed when the milk is mixed with coffee either hot or cold.

In the preferred embodiment, the liquid plant-based milk having an ingredient composition consisting of the following ingredients:

at least one plant protein as the only source of protein of said composition, preferably pea protein isolate and/or faba bean protein isolate, at least one plant-based oil or fat, at least one natural sweetener, calcium citrate as the only calcium salt of said composition at least one buffer selected from the list of dipotassium phosphate, disodium phosphate, potassium lactate, sodium lactate, potassium carbonate, sodium carbonate, potassium citrate, sodium citrate and a mix of them, and their corresponding acids, for pH adjustment, optionally flavours, colorants, vitamins, water.

The milk is a plant-based milk and not a dairy milk. In particular, the ingredient composition does not comprise dairy proteins or dairy fats.

The ingredient composition of the milk comprises at least one plant protein.

The milk does not comprise other proteins than plant proteins.

According to one preferred embodiment, the at least one plant protein is pea protein only. The pea protein according to the invention may be pea protein isolated from or extracted from green, yellow or purple peas (*Pisum sativum*). The pea protein may be pea protein fraction. The pea protein may be from the seeds of green peas. For example, the pea protein may be a vegetable protein material isolated from pea with a protein content greater than 80% on a dry weight basis. Preferably the pea protein is a pea protein concentrate or a pea protein isolate.

Alternatively, the milk can comprise one other plant protein than pea protein or a mixture of two or three different plant proteins. These proteins include isolate concentrates or enzymatically treated flours.

Preferably, the at least one plant protein is present in the ingredient composition in an amount comprised between 2 and 8% in weight of the ingredient composition.

According to another preferred embodiment, the at least one plant protein is faba bean protein isolate only.

The ingredient composition of the milk comprises at least one plant oil or fat.

Plant oil or fat can be selected from the group consisting of palm kernel oil, canola oil, soy bean oil, sunflower oil, safflower oil, cotton seed oil, palm oil, corn oil, coconut oil, microalgae oil and combinations of these oils.

According to the preferred embodiment, the at least one plant fat is high oleic sunflower oil. Preferably, the at least one plant fat is present in the ingredient composition in an amount comprised between 1 and 5% in weight of the ingredient composition.

The ingredient composition of the milk comprises at least one natural sweetener, like sugar, carbohydrate base sweeteners consisting of sugars such as fructose, glucose, maltose, sucrose, lactose, dextrose, high fructose corn syrup or sugar substitutes like e.g. sorbitol, mannitol, xylitol or combinations thereof, and mixtures of same.

Preferably, the at least one natural sweetener is present in the ingredient composition in an amount comprised between 1 and 10% in weight of the milk of the ingredient composition.

The ingredient composition of the milk comprises calcium citrate tetrahydrate as the only salt of calcium of said composition. Preferably, calcium citrate tetrahydrate is also the main source of calcium in the ingredient composition if, for example, calcium is introduced too through other ingredients than salts like water or the alt least one plant based proteins.

Preferably, calcium citrate tetrahydrate is present in the ingredient composition in an amount comprised between 0.18 and 1.8% in weight of the milk of the ingredient composition.

In addition to its property of stabilizing the milk even in acidic coffee, calcium citrate tetrahydrate presents the advantage of introducing calcium in the composition, which can be a nutritional advantage in a plant-based milk.

The ingredient composition of the milk comprises at least one buffer selected from the list of dipotassium phosphate, disodium phosphate, sodium lactate, potassium lactate, sodium carbonate, potassium carbonate, sodium citrate, potassium citrate and a mix of them.

Buffer adjusts the pH and interacts partially with free calcium. If needed the corresponding acids can be used for pH adjustment.

According to the preferred embodiment, the buffer is dipotassium phosphate and this dipotassium phosphate is present in the ingredient composition in an amount comprised between 0.5 and 1.8% in weight of the milk of the ingredient composition.

In one preferred embodiment, the ingredient composition of the liquid plant-based milk consists in:

pea protein isolate, at least one plant-based oil, at least one natural sweetener, calcium citrate as the only source of calcium of said composition, dipotassium phosphate, water, and optionally flavours, colorants and/or vitamins.

In another preferred embodiment, the ingredient composition of the liquid plant-based milk consists in:

faba bean protein isolate, at least one plant-based oil, at least one natural sweetener, calcium citrate as the only source of calcium of said composition, dipotassium phosphate, water, and optionally flavours, colorants and/or vitamins.

In the liquid plant-based milk, the at least one plant protein and the at least one plant-based fat are emulsified and form agglomerates inside the milk.

Generally, the mean diameter D[4,3] of the agglomerates ranges between 1 and 30 $\mu$m as measured by laser diffraction. In the present invention, the term D[4,3] is used conventionally to refer to the volume-weighted mean diameter of the particle distribution, sometimes called the De Brouckere mean diameter. The agglomerate particle size distribution may be measured using Malvern® Mastersizer 3000 or an equivalent measurement system. For the measurements a sample may e.g. be dispersed in the Hydro SM measuring cell until an obscuration rate of 9-10% is obtained and then analyzed in the Mastersizer.

Generally the pH of the milk is comprised between 6.7 and 7.8.

Generally the total solid content of the milk is comprised between 8% to 24% in weight.

The milk is free of gums, hydrocolloid thickeners and synthetic emulsifiers. These ingredients are no necessary since the use of calcium citrate tetrahydrate as the only salt of calcium is sufficient to obtain a stable dispersion of the agglomerates of the milk even when the milk is in contact with acidic coffee.

In a second aspect, there is provided a method of preparation of the above plant-based milk, said method comprising the steps of:

mixing water, the at least one plant protein, the at least one plant-based fat or oil, the at least one natural sweetener, calcium citrate tetrahydrate, the at least one buffer and optional flavours, colorants, vitamins, in order to obtain an emulsion, optionally adjusting pH, homogenizing or shearing the composition, heating the homogenized or sheared composition, aseptic filling the composition in containers.

Usually the step of mixing happens with hot water, e.g. above 50° C., to initiate the formation of the emulsion of fat or oil and protein in water.

The homogenizing or shearing step aims to finalize the emulsification of the composition already pre-emulsified during mixing of the ingredients.

The heating step aims to stabilize the emulsion produced during the homogenizing or shearing step.

Heating can be performed at a temperature of 80° C. to 125° C. for a period of 30 seconds to 20 minutes, or consist in a UHT treatment such as heating performed at a temperature of above 125° C. for 3-45 seconds.

The two steps of homogenizing or shearing and heating can happen simultaneously.

In a third aspect, there is provided the use of the plant-based milk such as described above as an additive in a coffee based beverage.

Example 1: Pea Protein Milks According to the Invention

Two plant-based milks were prepared from the following ingredient compositions:

TABLE 1

| Ingredient | Recipe 1 % weight | Recipe 2 % weight |
|---|---|---|
| pea protein isolate Pisane C9 from Cosucra | 4.06 | 4.06 |
| Brown sugar | 3.00 | 3.00 |
| High oleic sunflower oil | 1.90 | 1.90 |
| calcium citrate tetrahydrate | 0.90 | 0.90 |
| dipotassium phosphate | 0.90 | 0.90 |
| vanilla flavour | | 0.12 |
| Reversed osmosis water | up to 100 | up to 100 |

The milks were prepared as follows.

Pea protein isolate, brown sugar and water at 65° C. were mixed and sheared for 1 hour in a Scanima mixer maintained at 62° C. Then high oleic sunflower oil was added and high shear was applied to the mixture during 10 min.

The resulting pre-emulsion was transferred in a Viscojet high shear mixer maintained at 62° C. Dipotassium phosphate was added and high shear mixing was maintained during 5 to 10 min, then calcium citrate tetrahydrate was introduced and high shear mixing was maintained during 5 to 10 min. Then, in the case of Recipe 2, vanilla flavour was introduced under moderate stirring until it is visibly dissolved.

The pH of the resulting emulsion was controlled and eventually adjusted to a pH of 6.65 with buffer salts if necessary.

The emulsion was homogenised at 200 bars at the temperature of 62° C., then the homogenised emulsion was submitted to a UHT (ultra high temperature) treatment by direct steam injection at 154° C. during 5 seconds and at a flow rate of 1000 l/h.

Finally the heated emulsion was submitted to aseptic filling in 200 ml TetraPak containers.

For each of the two milks, the mineral composition was analysed as follows:

TABLE 2

| Mineral | mg/100 g | mmol/l |
|---|---|---|
| Ca | 191 | 48 |
| Na | 83 | 36 |
| K | 413 | 106 |
| P | 202 | 65 | and citrate was present at a level of 597 mg/100 g that is 32 mmol/l.

In both milks:

the mean diameter D[4,3] of the agglomerates was 28.1 μm.

the pH (at 20° C.) was 6.80.

The agglomerate particle size distribution was measured using Malvern® Mastersizer 3000 or an equivalent measurement system. For the measurements a sample was dispersed in the Hydro SM measuring cell until an obscuration rate of 9-10% is obtained and then analyzed in the Mastersizer.

Example 2—Use of the Milk of Example 1 with Coffee 2.1. Each obtained plant-based milks of Example 1 was loaded in the milk storing container of a coffee beverages automatic machine. Milk was pumped and foamed like a traditional dairy milk.

When mixed with coffee, either hot or cold, no flocculation of the agglomerates was observed.

When foamed, the resulting foam was thick and stable. It could be easily used for producing latte art at the top of coffee beverages.

2.2. In addition, the milk of Example 1 and obtained with Recipe 1 was used to prepare different types of coffee beverages:

hot latte coffee obtained by mixing hot coffee and frothed plant-based milk in a ratio of 3.2:1 (milk:coffee)

hot cappuccino coffee obtained by mixing hot coffee and frothed plant-based milk in a ratio of 2:1 (milk:coffee)

hot cortado coffee obtained by mixing hot coffee and frothed plant-based milk in a ratio of 1:1 (milk:coffee)

cold latte coffee obtained by mixing cold brew coffee and frothed plant-based milk in a ratio of 3.2:1 (milk:coffee)

cold cappuccino coffee obtained by mixing cold brew coffee and frothed plant-based milk in a ratio of 2:1 (milk:coffee)

cold cortado coffee obtained by mixing cold brew coffee and frothed plant-based milk in a ratio of 1:1 (milk:coffee).

In each beverage preparation, the volume of milk was fixed to get 160 g of milk and the volume of coffee was adapted to respect above ratios milk:coffee.

Hot coffee was prepared by dissolution of 2 g of soluble coffee (Nescafé Milano Ispirazione) with 100 g of hot water. Hot coffee presented a temperature of 80° C. Cold brew coffee presented a temperature of 12° C.

For each preparation, the plant-based milk was taken from the fridge, where it had been stored for at least 24 h. From the fridge, the milk was directly put into a milk frother Aeroccino commercialised by Nespresso and then frothed. Depending if the frothed milk would be used for hot or cold coffee beverage preparations, hot or the cold frothing process of the milk frother were selected (yielding 65° C. for hot and 8.5° C. for cold frothing).

Then the frothed milk was introduced in the corresponding volume of coffee.

FIG. 1 provide photos of these six beverages.

The six beverages presented a thick and dense layer of foam. None of six coffee beverages showed flocculation and the beverages remained stable in time.

The tree hot beverages comprised a very thick layer of foam:

in the cortado beverage the layer of foam was greater than the height of liquid, in the cappuccino beverage the layer of foam was almost as thick as the height of liquid.

The stability of the layer of foam for the above prepared cold and hot latte coffee was measured during 5 minutes and reported in below Table 3.

TABLE 3

| Time (min) | Foam volume (mL) | Foamability* (%) | Foam stability** (%) |
|---|---|---|---|
| | | Cold latte coffee | |
| 1 | 101.0 ± 7.5 | 63.0 ± 4.7 | |
| 2 | 94.7 ± 8.4 | | |
| 5 | 90.9 ± 6.9 | | 90.1 ± 2.0 |
| | | Hot latte coffee | |
| 1 | 160.1 ± 6.8 | 99.9 ± 4.2 | |
| 2 | 148.8 ± 6.3 | | |
| 5 | 138.3 ± 6.6 | | 86.4 ± 2.8 |

*ratio of foam volume/milk volume in the beverage
**ratio of foam at t = 5 min/foam at t = 1 min 2.3. In addition, the milk of Example 1 was taken from the fridge and added as a simple creamer in hot coffee (80° C.) according to three different ratios (milk:coffee): 1:1, 1:2 and 1:3. No flocculation was observed and the beverages remain stable.

2.4. Finally, the quality of the foam—in particular its density, the small size of the foam and the absence of big bubbles—enabled the performance of latte art.

Example 3—Comparison with Commercial Plant-Based Milks

Hot milk and coffee beverages were prepared with the milk of Example 1 and with three other plant-based milks presenting different ingredient compositions as mentioned in Table 4. The milks were frothed with the milk frother Aeroccino then 120 g of the frothed milk was introduced in 100 g of hot coffee (prepared in the same manner as in Example 2.2).

TABLE 4

| Ingredient | Minor Figures Oat M*lk | Sproud | Alpro almond |
|---|---|---|---|
| plant based protein | oat | pea protein | almond |
| buffer | tricalcium phosphate calcium carbonate | dipotassium phosphate calcium carbonate | tricalcium phosphate |
| others | | | locust bean gum, gellan gum |

The properties of the cappuccinos are summarised in Table 5.

TABLE 5

| Ingredient | Minor Figures Oat M'lk | Sproud | Alpro almond | Milk of Recipe 1 |
|---|---|---|---|---|
| Volume of foam | 10 mL | 40 mL | | 110 mL |
| Latte art performance | nice | nice | poor | nice |

Example 4

Two plant-based milks were prepared with the same components of Recipe 1 of Example 1 except that the calcium citrate tetrahydrate was replaced by calcium chloride or calcium phosphate respectively. In each case, the weight percentage of the calcium salt was adapted to keep the same molar concentration of calcium in the recipe, that is 47 mmol/L. Accordingly, the plant-based milks were prepared with the following recipes:

TABLE 6

| Ingredient | Recipe 3 % weight | Recipe 4 % weight |
|---|---|---|
| pea protein isolate Pisane C9 from Cosucra | 4.06 | 4.06 |
| Brown sugar | 3.00 | 3.00 |
| High oleic sunflower oil | 1.90 | 1.90 |
| calcium chloride | 0.70 | |
| calcium phosphate | | 0.50 |
| dipotassium phosphate | 0.90 | 0.90 |
| Reversed osmosis water | up to 100 | up to 100 |

Hot milk and coffee beverages were prepared with the milks obtained from Recipe 1, Recipe 3 and Recipe 4. For each milk, 120 g of milk was frothed with the milk frother Aeroccino. Then the frothed milk was introduced in 100 g of hot coffee (prepared in the same manner as in Example 2.2).

The beverage prepared with the milk of Recipe 1 presented 130 ml of foam above the liquid, meaning a very high foamability of 108%. The foam was dense and the bubbles remain small providing a creamy mouthfeel stabilised in time without the need of adding stabilizer like hydocolloids.

The beverage prepared with Recipe 3 did not present any foam above the liquid.

The beverage prepared with Recipe 4 provided 120 ml of foam above the liquid, meaning a foamability of 100%.

The beverage prepared with the milk of Recipe 1 provided the best creamy mouthfeel and physical product stability.

Figure 2:
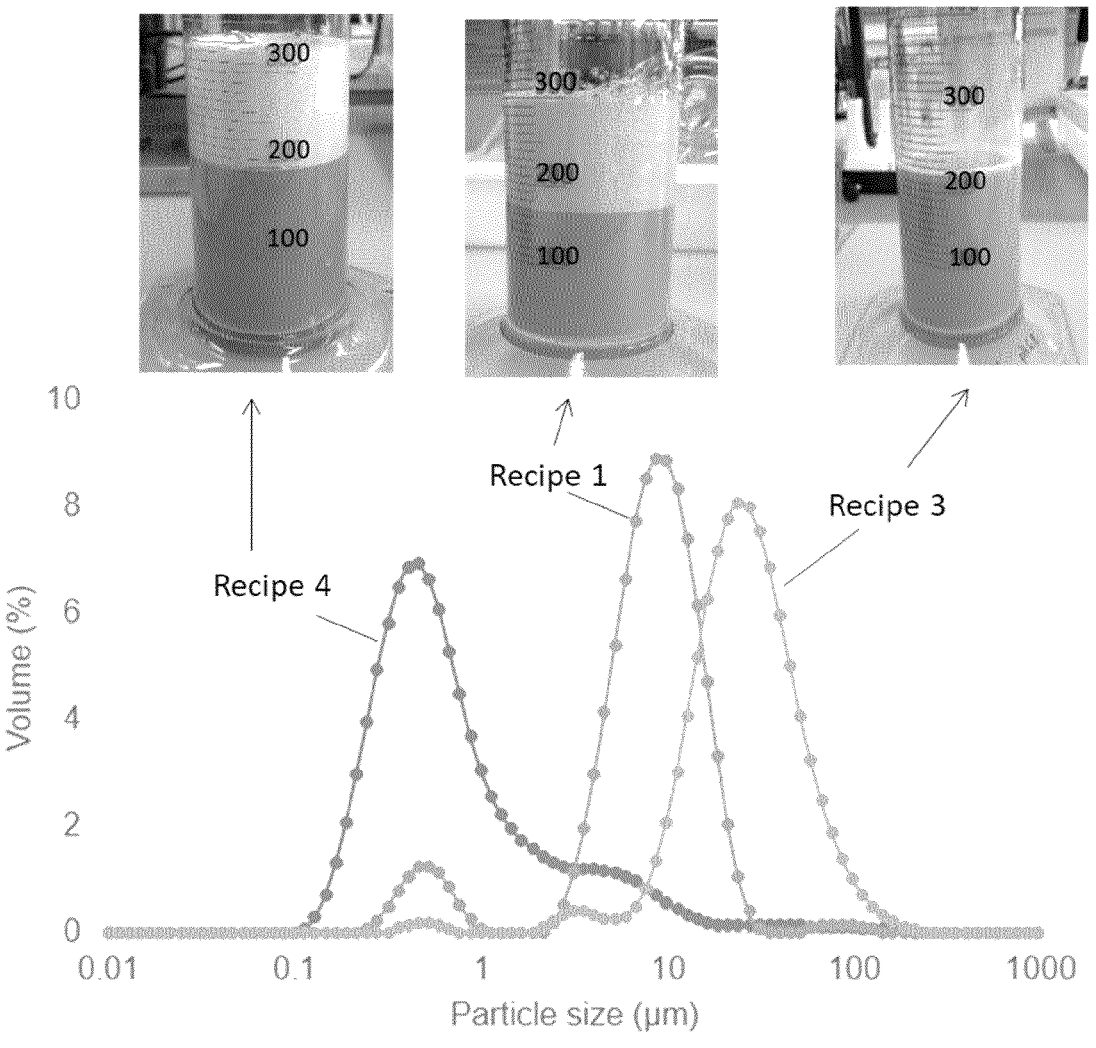
FIG. 2 shows the photos of the three beverages prepared with the three milks and the agglomerate particle size distributions of these three milks prepared with the different recipes in Example 4.

FIG. 2 provides the photos of the beverages prepared with the three milks and the agglomerate particle size distributions of these three milks prepared with the different recipes. The agglomerate particle size distribution was measured using Malvern® Mastersizer 3000 or an equivalent measurement system. For the measurements a sample was dispersed in the Hydro SM measuring cell until an obscuration rate of 9-10% is obtained and then analyzed in the Mastersizer.

Example 5

A new plant-based milk was prepared with the same components of recipe 1 of Example 1 except that two calcium salts were used: a part of the calcium citrate tetrahydrate was replaced by calcium carbonate. The weight percentages of the calcium salts were adapted to keep the same molar concentration of calcium in the recipe that is 190 mg Ca/100 g milk. Accordingly, the plant-based milk was prepared with the following recipe:

TABLE 7

| Ingredient | Recipe 5<br>% weight |
| --- | --- |
| pea protein isolate<br>Pisane C9 from Cosucra | 4.06 |
| Brown sugar | 3.00 |
| High oleic sunflower oil | 1.90 |
| calcium citrate tetrahydrate | 0.45 |
| calcium carbonate | 0.24 |
| dipotassium phosphate | 0.90 |
| Reversed osmosis water | up to 100 |

This milk was used as a creamer to prepare three beverages at three different mixing ratio with coffee (milk:coffee) that are 1:1, 1:2 and 1:3. In three beverages flocculation and sedimentation were observed.

Same results could be obtained with a similar plant-based milk comprising calcium phosphate in place of calcium carbonate.

Example 6

A new plant-based milk was prepared with the same components of Recipe 1 of Example 1 except that disodium phosphate was used in place of dipotassium phosphate. The quantity was adjusted to get the similar molar concentration as for dipotassium phosphate in Recipe 1. That required a quantity of disodium phosphate (0.73% weight of composition) that impacted directly and unpleasantly the taste of the milk.

Example 7—Faba Bean Protein Milk According to the Invention

A plant-based milk was prepared from the following ingredient composition:

TABLE 8

| Ingredient | Recipe 6<br>% weight |
| --- | --- |
| faba bean protein isolate | 3.7 |
| Brown sugar | 3.00 |
| High oleic sunflower oil | 1.90 |
| calcium citrate tetrahydrate | 0.90 |
| dipotassium phosphate | 1.00 |
| Reversed osmosis water | up to 100 |

The milk was prepared according to the same steps as in Example 1.

In the milk:

the mean diameter D[4,3] of the agglomerates was 27.9 μm.

the pH (at 20° C.) of was 6.78.

Cold and hot latte coffees were prepared with this milk in the same manner as in Example 2.2. The hot coffee latte presented a layer of foam of 190 mL and the cold coffee latte presented a layer of foam of 120 mL. This layer remained stable in time.

The milks of the present invention present the advantage of guaranteeing agglomerates stability with a short list of ingredients (one calcium salt only and no gums, hydrocolloid thickeners or synthetic emulsifiers needed) while providing foam quality necessary for coffee preparations (no flocculation, mouthfeel, foam stability in time, foam volume).

The invention claimed is:

1. A liquid plant-based milk having an ingredient composition comprising:

at least one plant protein, wherein the liquid plant-based milk does not contain any protein other than the at least one plant protein, at least one plant-based oil or fat, at least one natural sweetener, calcium citrate tetrahydrate as the only salt of calcium in said composition, at least one buffer selected from the list of dipotassium phosphate, disodium phosphate, potassium lactate, sodium lactate, potassium carbonate, sodium carbonate, potassium citrate, and a mix of them and their corresponding acids, water, and said milk being free of gums, hydrocolloid thickeners and synthetic emulsifiers.

2. The liquid plant-based milk according to claim 1, which comprises a mineral composition of:

between 10 and 100 mmol/l of Ca, between 10 and 80 mmol/l of Na, between 20 and 200 mmol/l of K, and between 15 and 150 mmol/l of P, and the at least one buffer comprises potassium citrate, and the liquid plant-based milk comprises the potassium citrate in a concentration between 7 and 70 mmol/l.

3. The liquid plant-based milk according to claim 1, wherein the at least one plant protein is pea protein only or faba bean protein only.

4. The liquid plant-based milk according to claim 1, wherein the at least one plant protein is present in the ingredient composition in an amount comprised between 2 and 8% in weight of the ingredient composition.

5. The liquid plant-based milk according to claim 1, wherein the at least one plant oil or fat is present in the ingredient composition in an amount comprised between 1 and 5% in weight of the ingredient composition.

6. The liquid plant-based milk according to claim 1, wherein the at least one natural sweetener is present in the ingredient composition in an amount comprised between 1 and 10% in weight of the ingredient composition.

7. The liquid plant-based milk according to claim 1, wherein the calcium citrate tetrahydrate is present in the ingredient composition in an amount comprised between 0.18 and 1.8% in weight of the ingredient composition.

8. The liquid plant-based milk according to claim 1, wherein the buffer is dipotassium phosphate and said dipotassium phosphate is present in the ingredient composition in an amount comprised between 0.5 and 1.8% in weight of the ingredient composition.

9. The liquid plant-based milk according to claim 1, wherein the ingredient composition consists of:

pea protein isolate, at least one plant-based oil, at least one natural sweetener, calcium citrate tetrahydrate as the only salt of calcium of said composition, dipotassium phosphate, and water.

10. The liquid plant-based milk according to claim 1, wherein the ingredient composition consists of:

faba bean protein isolate, at least one plant-based oil, at least one natural sweetener, calcium citrate tetrahydrate as the only salt of calcium of said composition, dipotassium phosphate, and water.

11. The liquid plant-based milk according to claim 1, wherein the at least one plant protein and the at least one plant-based fat are emulsified and form agglomerates inside the milk.

12. The liquid plant-based milk according to claim 11, which comprises a mean diameter D of the agglomerates ranges between 1 and 30 μm.

13. The liquid plant-based milk according to claim 1, wherein the pH of said milk is comprised between 6.7 and 7.8.

14. The liquid plant-based milk according to claim 1, which comprises a total solid content of between 8% to 24% in weight.

* * * * *